US000002031H

(19) United States

(12) Statutory Invention Registration

Harrell et al.

(10) Reg. No.: US H2031 H

(43) Published: Jun. 4, 2002

(54) APPARATUS AND METHOD FOR CONTROLLING THE END OF FILL OF A FLUID ACTUATED CLUTCH

(75) Inventors: Kendall R. Harrell, Morton; Javad Hosseini, Edelstein; Alan L. Stahl, Peoria, all of IL (US)

(73) Assignee: Caterpillar Inc., Peoria, IL (US)

(21) Appl. No.: 09/217,243

(22) Filed: Dec. 21, 1998

(51) Int. Cl.[7] ..... G06G 7/70; F16D 48/06

(52) U.S. Cl. ..... 701/68

(56) References Cited

U.S. PATENT DOCUMENTS

| | | | | |
|---|---|---|---|---|
| 4,953,091 | A | 8/1990 | Baltusis et al. | |
| 5,046,174 | A | 9/1991 | Lentz et al. | |
| 5,072,390 | A | 12/1991 | Lentz et al. | |
| 5,335,568 | A | 8/1994 | Kammerl et al. | 477/109 |
| 5,475,590 | A | 12/1995 | Palansky et al. | |
| 5,475,595 | A | 12/1995 | Asahara et al. | |
| 5,551,930 | A | 9/1996 | Creger et al. | 477/130 |
| 5,580,332 | A | 12/1996 | Mitchell et al. | 477/143 |
| 5,588,327 | A | 12/1996 | Downs et al. | 74/335 |
| 5,594,643 | A | 1/1997 | Birchenough et al. | |

*Primary Examiner*—Daniel T. Pihulic

(74) *Attorney, Agent, or Firm*—W. Bryan McPherson

(57) ABSTRACT

The present invention discloses a system and a method for controlling the timing of the filling of a fluid actuate. The system includes, a fluid actuated clutch 83, an electronic controller adapted to detect an end-of-fill point for the fluid actuated clutch 83, compare the end-of-fill point with a desired end-of-fill point and adjust at least one of a plurality of clutch fill parameters in response to the comparison in order to control the timing of the filling of the clutch 83, and a control valve that is activated by the electronic controller.

20 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLUTCH ENABLE SWITCH
81
MACHINE DRIVE TRAIN
18
24
8
ELECTRONIC CONTROL MODULE
40
TRANSMISSION
16
10
44
22
49
42
14
45
P
S
T
83
46
48
20
77
28
12
ENGINE

APPARATUS AND METHOD FOR CONTROLLING THE END OF FILL OF A FLUID ACTUATED CLUTCH

TECHNICAL FIELD

This invention relates generally to a method of clutch control and, more particularly, to a method of controlling the end-of-fill point for a fluid actuated clutch.

BACKGROUND ART

In general, the output shaft of an engine is typically connected to an input shaft of a torque converter and an output shaft of a torque converter is typically connected to an input shaft of a transmission. The lock-up clutch is located between the input shaft and output shaft of a torque converter so as to provide a rotatable connection. An electronic control system is typically utilized to smoothly engage and disengage a fluid actuated clutch. The clutch is interfaced to an associated solenoid valve through the electronic control system. The solenoid valve is modulated to control the clutch pressure in response to command signals from the electronic control system.

To precisely time the engagement of the clutch, the fill time is an important parameter. Fill time is defined as the time required to fill an oncoming clutch cavity with fluid. During this fill period, a clutch piston will stroke and clutch plates will move to the point of "touch-up". However, until the clutch plates are compressed together, the clutch cannot transmit any significant torque. Therefore, the end-of-fill time is important to ascertain when this critical moment is reached. A harsh engagement can result in a torque spike that is transmitted through the drivetrain of the machine and creates a "jerk". This jerk is uncomfortable to the operator and diminishes the life expectancy of the associated drivetrain components of the machine.

One known arrangement utilizes a separate flow sensing valve having an electrical switch disposed thereon. The flow into the flow sensing valve is directed through a fixed orifice to the associated hydraulic clutch. Once the flow through the valve ceases, the absence of a pressure drop across the fixed orifice permits the flow sensing valve to return to a spring biased, flow blocking position. Once the flow sensing valve is in the spring biased position, this triggers an electrical switch that indicates that the clutch is filled. A major drawback with this arrangement is that it requires all fluid to flow through a fixed orifice and also through a separate flow sensing switch for each clutch in the system.

Still another known mechanism for determining end-of-fill is to control the amount of time that fluid is allowed to flow toward the clutch. These arrangements do not account for variances in control valves or clutch activating chambers. To overcome these variances, a number of control schemes have been devised to adaptively change the fill time based on previous clutch fills. However, these control schemes depend on costly and time consuming calibration techniques.

Yet another technique for determining the end-of-fill point involves monitoring the electronic activation of the control valve that directs fluid to the clutch. When the actuating chamber of the clutch is full, the increase in pressure operates upon the control valve to move it back to a flow blocking position. The force that is acting to move the control valve back to the flow blocking position is acting against the electrical force that moved the control valve to the flow passing position. This creates an electrical voltage spike that is detected by an electronic controller. This voltage spike represents the end-of-fill point.

The present invention is directed to overcoming one or more of the problems set forth above.

DISCLOSURE OF THE INVENTION

In one aspect of this invention, a system for controlling the timing of the filling of a fluid actuated clutch is disclosed. The system comprises a fluid actuated clutch, an electronic controller adapted to detect an end-of-fill point for the fluid actuated clutch, and compare the end-of-fill point with a desired end-of-fill point and a control valve that is activated by the electronic controller. The control valve is operatively connected to the fluid actuated clutch.

In another aspect of the present invention, a method for controlling the timing of the filling of a fluid actuated clutch is disclosed. The clutch is operatively connected to a control valve that is activated by an electronic controller. The method includes the steps of determining an end-of-fill point, comparing said end-of-fill point with a desired end-of-fill point, and responsively controlling the timing of the filling of the fluid actuated clutch.

BRIEF DESCRIPTION OF THE DRAWINGS

For a better understanding of the present invention, reference may be made to the accompanying drawings in which.

BEST MODE FOR CARRYING OUT THE INVENTION

Figure 1:
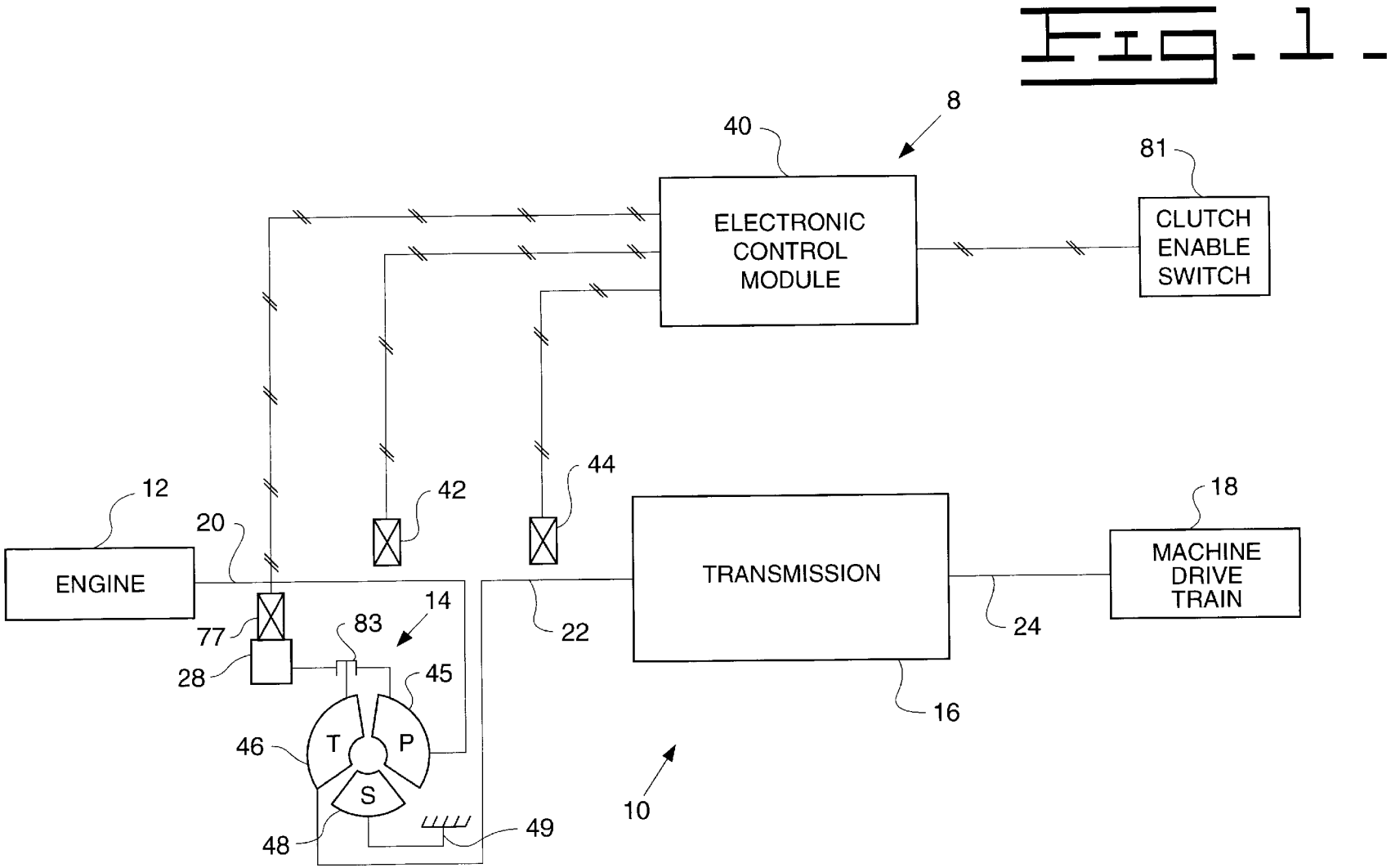
FIG. 1 is a block diagram of an electronic control system of a machine including an engine, drivetrain, transmission, torque converter and a fluid actuated clutch.

Referring now to the drawings, and initially to FIG. 1, an electronic control system 8 of a power train 10 is depicted that includes an internal combustion engine 12, a fluidic torque converter 14, a multi-speed fluid operated power transmission 16, and a machine drivetrain 18. The engine 12 is connected to the torque converter 14 by a first shaft 20, the torque converter 14 is connected to the transmission 16 by a second shaft 22, and the transmission 16 is connected to the machine drivetrain 18 by a third shaft 24. The shafts 20, 22, and 24 can be eliminated with the combustion engine 12, the fluidic torque converter 14, and the multi-speed fluid operated power transmission 16 being directly connected together. This type of interconnection would depend on the type of machine. The torque converter 14 includes an impeller 45 coupled to the first shaft 20, a turbine member 46 coupled to the second shaft 22, and a stator member 48 that may be grounded to a housing 49 for the torque converter 14.

The control portion of the drivetrain will now be discussed. An operator produces a desired engagement of a fluid actuated clutch 83 through the activation of a clutch enable switch 81. The clutch enable switch 81 is optional and not always necessary for activation of the fluid actuated clutch 83. An electronic control module 40 receives the clutch enable signal and then controls the operation of a solenoid control valve 77. The electronic control system also receives various other inputs representing machine system parameters. These other inputs include an engine speed signal from an engine speed sensor 42 and a torque converter output signal from a torque converter output sensor 44. The clutch slip is defined as the difference between the input speed and the output speed of the clutch. For a lock-up clutch it is defined as the difference between the engine speed and the torque converter output speed.

The engine speed sensor 42 and the torque converter output sensor 44 are preferably conventional electrical transducers. A typical, but nonlimiting example of a conventional electrical transducer would be a magnetic speed pickup. However, numerous other types and methods of speed sensing may be utilized.

The electronic control module 40 delivers a clutch command signal that is proportional to the desired current needed to operate the solenoid control valve 77. In the preferred embodiment, the current driver utilizes a pulse width modulated voltage to produce the desired current. The solenoid control valve 77 is configured to maintain communication of oil to a proportional control valve 28, that is sufficient to maintain a clutch pressure that is proportional to the solenoid current once the clutch 83 is filled. Therefore, the electronic control module 40 controls the clutch pressure by means of a proportional command signal provided to the solenoid control valve 77 that operates the clutch 83. In the preferred embodiment, the command signal is in the form of a current based signal. An increased current energizes the solenoid control valve 77, thereby operating the clutch 83.

Figure 2:
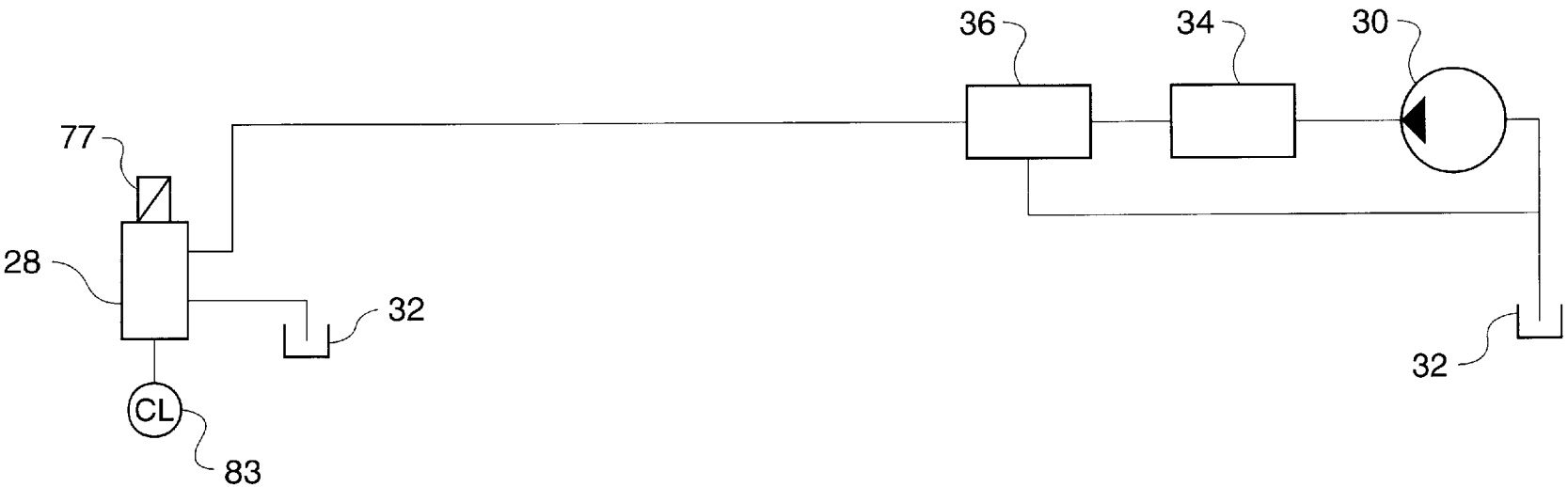
FIG. 2 is a block diagram illustrating an embodiment of a hydraulic system for a fluid actuated clutch.

Referring now to FIG. 2, a block diagram of a hydraulic system for the clutch 83 is shown. As merely an illustrative example, FIG. 2 represents a lock-up clutch that is sometimes referred to as a slipping clutch. The purpose of the lock-up clutch is to provide better machine performance during a load or carry operation. The lock-up-clutch will engage when the torque converter output speed is over a predetermined speed and will disengage when the torque converter output speed is below this predetermined torque converter output speed. When the lock-up clutch is engaged, the torque converter will be bypassed. This will provide a direct connection between the engine and the transmission. The clutch 83 is actuated by hydraulic pressure and upon engagement, requires a requisite amount of fill time before torque is initiated between a friction element that provides a driving force and a friction element that is driven by the friction element having the driving force. In other words, the fill time is the elapsed time between the time that the clutch piston moves from the released to the initial engagement position. The clutch 83 is selectively engaged and disengaged by means of the proportional pressure control valve 28.

The hydraulic circuit of the transmission includes a positive displacement pump 30 that supplies pressurized hydraulic fluid from the sump or reservoir 32, through a filtering unit 34, to the clutch 83 through the control valve 28. Optionally, a pressure relief valve 36 may be added to regulate the valve supply pressure. When the clutch 83 disengages, excess hydraulic fluid returns to the sump or reservoir 32. Although a lock-up clutch has been mentioned, the present invention could be directed to torque transmitting types of clutches that are not defined as a type of lock-up clutch.

Figure 3:
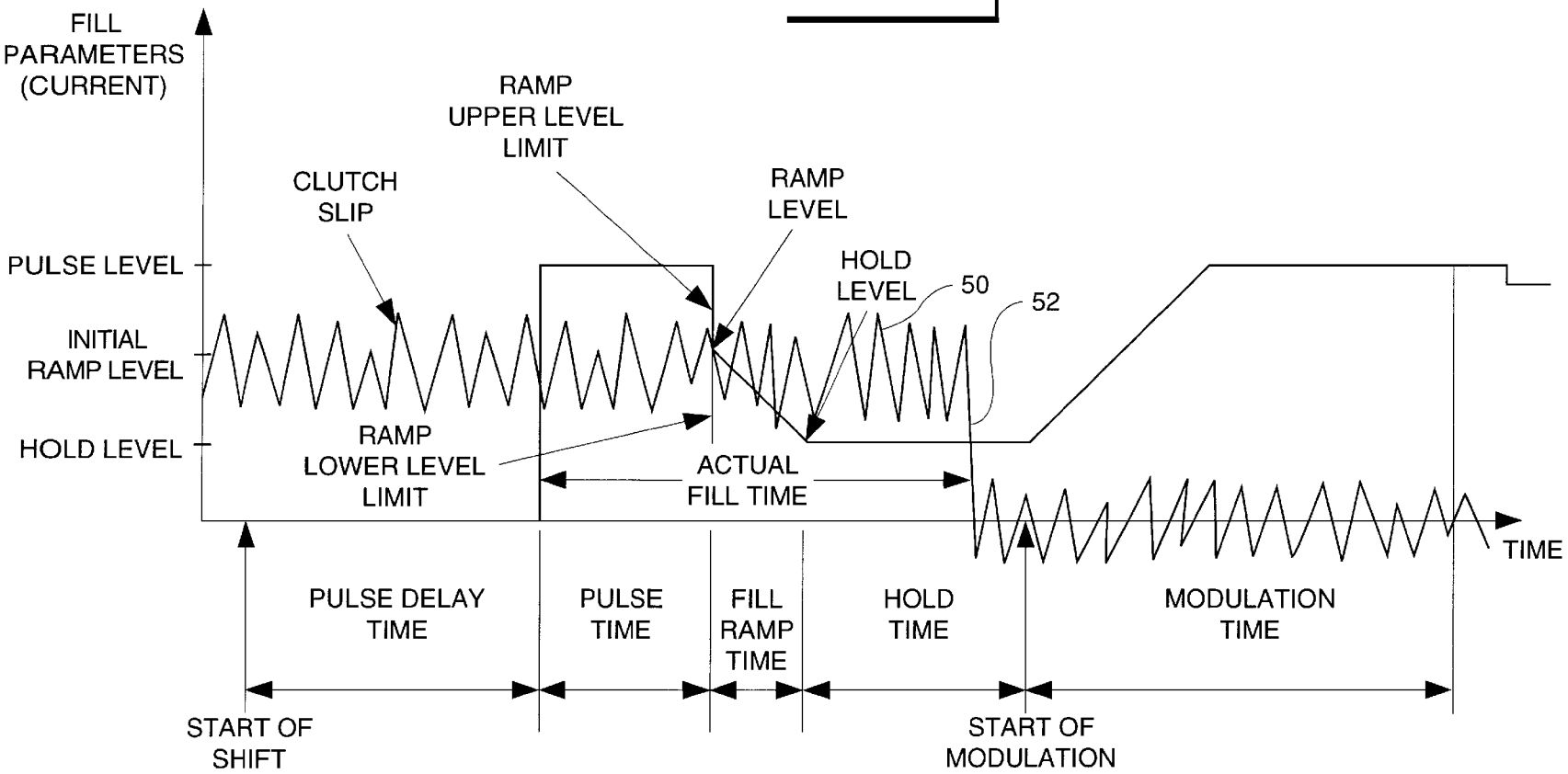
FIG. 3 is a timing chart illustrating the current level during the pulse time, ramp time, hold time, modulation time, and end-of-fill point in correlation with instantaneous clutch slip.

The command pulses utilized to perform a fluid actuated clutch shift are depicted in FIG. 3. Immediately at the start of the clutch shift, there is a small pulse delay time period. The command pulse is pulsed at a relatively high level for a predetermined period of time. This command pulse to the solenoid valve 77 quickly opens the control valve 28 to begin filling the fluid actuated clutch 83 and thereby stroking the respective fluid actuated clutch piston. The fluid actuated clutch command is then decreased from a ramp level during the ramp time to a hold level having a duration sufficient to completely fill the fluid actuated clutch 83. The value of the hold level is high enough to ensure completion of clutch fill and yet low enough to prevent torque spike when the clutch plates "touch up". After the fluid actuated clutch 83 is filled, the clutch pressure enters a modulation time period. This modulation phase can utilize either an open or closed loop control to gradually increase the clutch pressure to cause a desired decrease in clutch slip. The pressure within the clutch 83 is increased to and held at a level sufficient to maintain the clutch 83 in its fully engaged position.

Once the end-of-fill point is detected, a smooth transition into the modulation time period may result so that the clutch pressure is slowly and gradually increased with a corresponding decrease in clutch slip. This will prevent the torque spike that causes jerk and creates discomfort to the operator as well as decreasing the life expectancy of the drivetrain components. Either early or late engagement will cause a torque spike. The end-of-fill point should occur during the hold time when pressure on the clutch 83 is the lowest.

Also, as shown in FIG. 3, the instantaneous clutch slip is depicted in correlation with the current level of the fill parameters. In the preferred embodiment, the end-of-fill may be identified as the point in time when the instantaneous value of the clutch slip is less than a reference value of the clutch slip. The reference value of the clutch slip is dynamically determined during the operation of the clutch. In the preferred embodiment, the reference value of the clutch slip is dynamically determined based on an average of a predetermined number of loops or cycles of instantaneous clutch slip that is divided by a predetermined factor. Even a single cycle might suffice. The preferred predetermined factor represents a fixed percentage of the average clutch slip. This percentage typically ranges between thirty percent (30%) and fifty percent (50%) with the optimal value being thirty percent (30%). In an alternative embodiment, the reference value is dynamically determined by using a low pass digital filter software algorithm to filter the instantaneous clutch slip value, the output of the filter being divided by the predetermined factor. As illustrated, a first instantaneous clutch slip level 50 presents a marked contrast to a second clutch slip level 52. The instantaneous clutch slip level at 52 will be less than the reference clutch slip value so that at this point, the clutch slip indicates the end-of-fill for that clutch. The reference clutch slip value is preferably computed prior to the initiation of the command pulse. However, computation of the reference clutch slip value can occur at any time while the clutch slip is at the first instantaneous clutch slip level 50.

As shown, once the clutch 83 reaches the point of "touch-up", the instantaneous clutch slip will remain at this lower level, however, these later clutch slip values are not relevant because the end-of-fill point has already been determined. This predetermined factor varies depending on the design and structure of the respective clutch 83, the type and nature of the machine, the machine manufacturer, the number of cycles, and any software scaling factors. An illustrative, but nonlimiting, example would include a predetermined factor representing thirty (30%) of the average clutch slip or in the alternative, a predetermined factor of three (3) and a predetermined number of cycles or loops as ten (10) could be used for some motor graders, wheel loaders and off-highway trucks.

Figure 4:
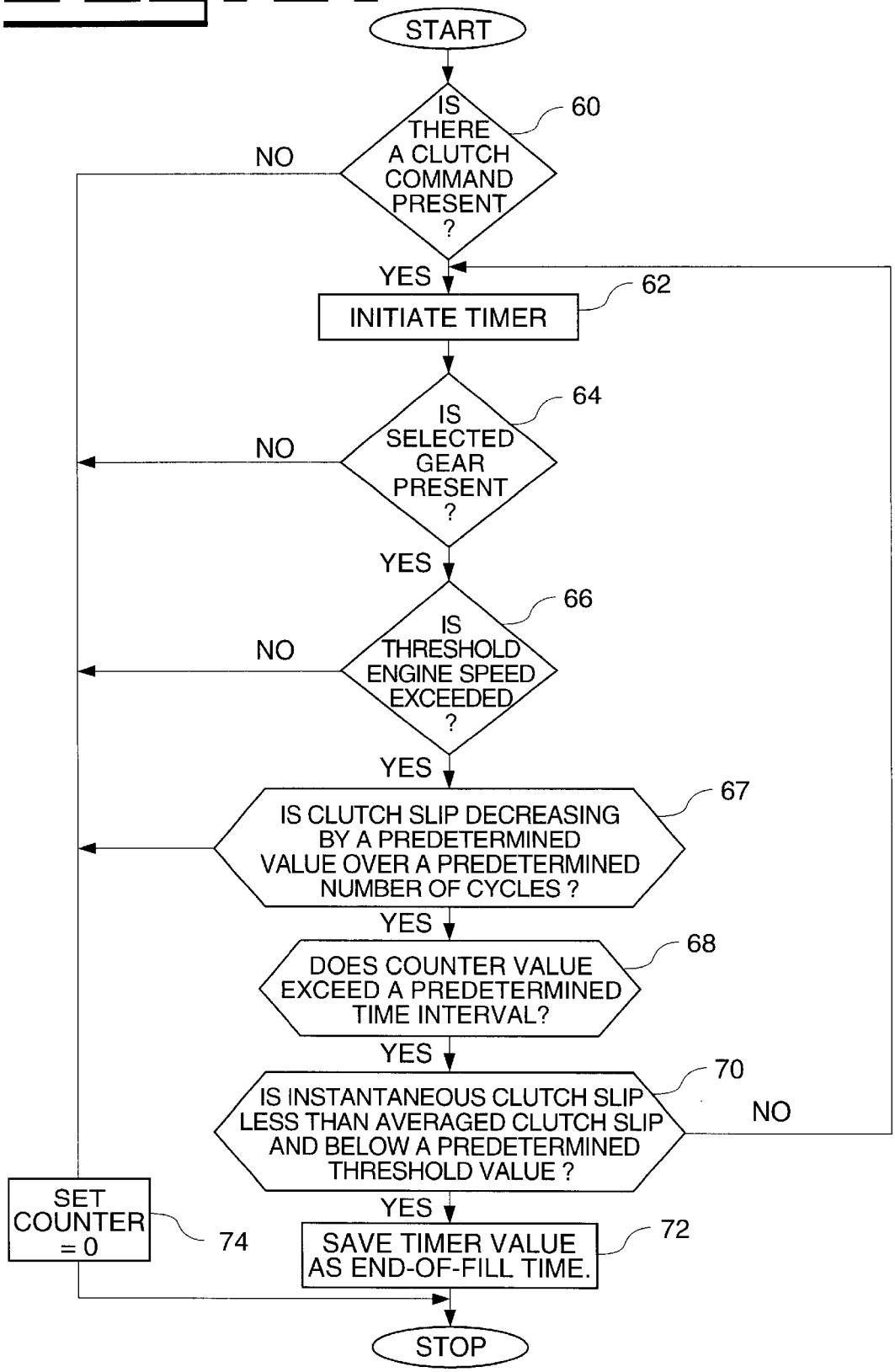
FIG. 4 is a flowchart illustrating software for determining the end-of-fill point for a fluid actuated clutch.

The preferred embodiment of the end-of-fill detecting software will now be discussed with reference to FIG. 4, which depicts a flowchart representative of the computer program instructions executed by the electronic control module 40 shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. As shown in FIG. 4, the program first determines whether a clutch command is present <60>. If the answer is no, the counter will be set to zero <74> and the process will stop. If the answer is yes, then a counter will be incremented by one (1) <62>. Preferably, the value of the counter is correlated to a value in real time by a timing function associated with the electronic control module 40.

There are four steps, although not critical to the process in principle, which attempt to minimize the possibility of detecting a false end-of-fill point and operate as a safeguard. These four steps are preferably monitored throughout the process or may be monitored once prior to the start of a primary program step.

The first of these steps involves the determination of whether the selected gear is present <64>. This selected gear is totally dependent on the type of engine utilized in a particular machine. An illustrative, but nonlimiting example, is equal or greater than second gear and less than or equal to third gear for motor graders, wheel loaders, and off-highway trucks. If the answer to this query is no, the counter is set to zero <74> and the program stops. Otherwise, the program will progress to the next step.

The second safeguard step is a determination of whether the engine speed exceeds a minimum threshold value <66>. Once again, these limits are dependent on the parameters of the clutch and a failure to be above this minimum threshold will result in the counter being set to zero <74>. An illustrative, but nonlimiting example, is an engine speed of 1,500 revolutions per minute for motor graders, wheel loaders, and off-highway trucks.

The third safeguard step is a determination of whether the torque converter slip is monotonically decreasing by a predetermined value over a predetermined number of cycles <67>. Once again, these limits are dependent on the parameters of the clutch and a failure to decrease over a predetermined number of cycles will result in the counter being set to zero <74>. An illustrative, but nonlimiting example, is a decrease over two or more cycles or loops for motor graders, wheel loaders, and off-highway trucks.

The fourth safeguard step merely compares the value of the counter with a predetermined time interval. A nonlimiting example of this time interval would include a summation of the pulse, ramp, hold, and modulation times <68>. If the value of the counter exceeds the summation of these time periods, the counter will be set to zero <74> and the program will stop. This is because the point in time representing the end of the fill period will have past.

The primary program step makes the determination as to whether or not the instantaneous clutch slip is less than a reference clutch slip value <68>. As previously described above, this predetermined factor and the number of loops or cycles vary depending on the design and structure of the clutch. The design and structure of the clutch depends upon the type and nature of the machine as well as the machine manufacturer. In addition, the parameters may be altered due to different scaling factors in the software. An illustrative, but nonlimiting, example would include a predetermined factor of three (3) and the number of loops or cycles being ten (10) for motor graders, wheel loaders, and off-highway trucks.

The software will keep looping through this primary program step <70>, the step of incrementing the counter by one (1) <62>, the first safeguard step <64>, the second safeguard step <66>, the third safeguard step <67> and the fourth safeguard step <68>, until this condition is reached and will then save the counter value at this point as the end-of-fill point <72>.

Once the end-of-fill point has been detected, the present invention provides a method for controlling the timing of the filling of the fluid actuated clutch 83. The method includes the steps of comparing the end-of-fill point with a desired end-of-fill point, and then dynamically adjusting at least one of a plurality of clutch fill parameters in response to the comparison. In the preferred embodiment, the desired end-of-fill point is a region, and the clutch fill parameter(s) are adjusted when the comparison indicates the end-of-fill point occurred outside the desired region.

Figure 5:
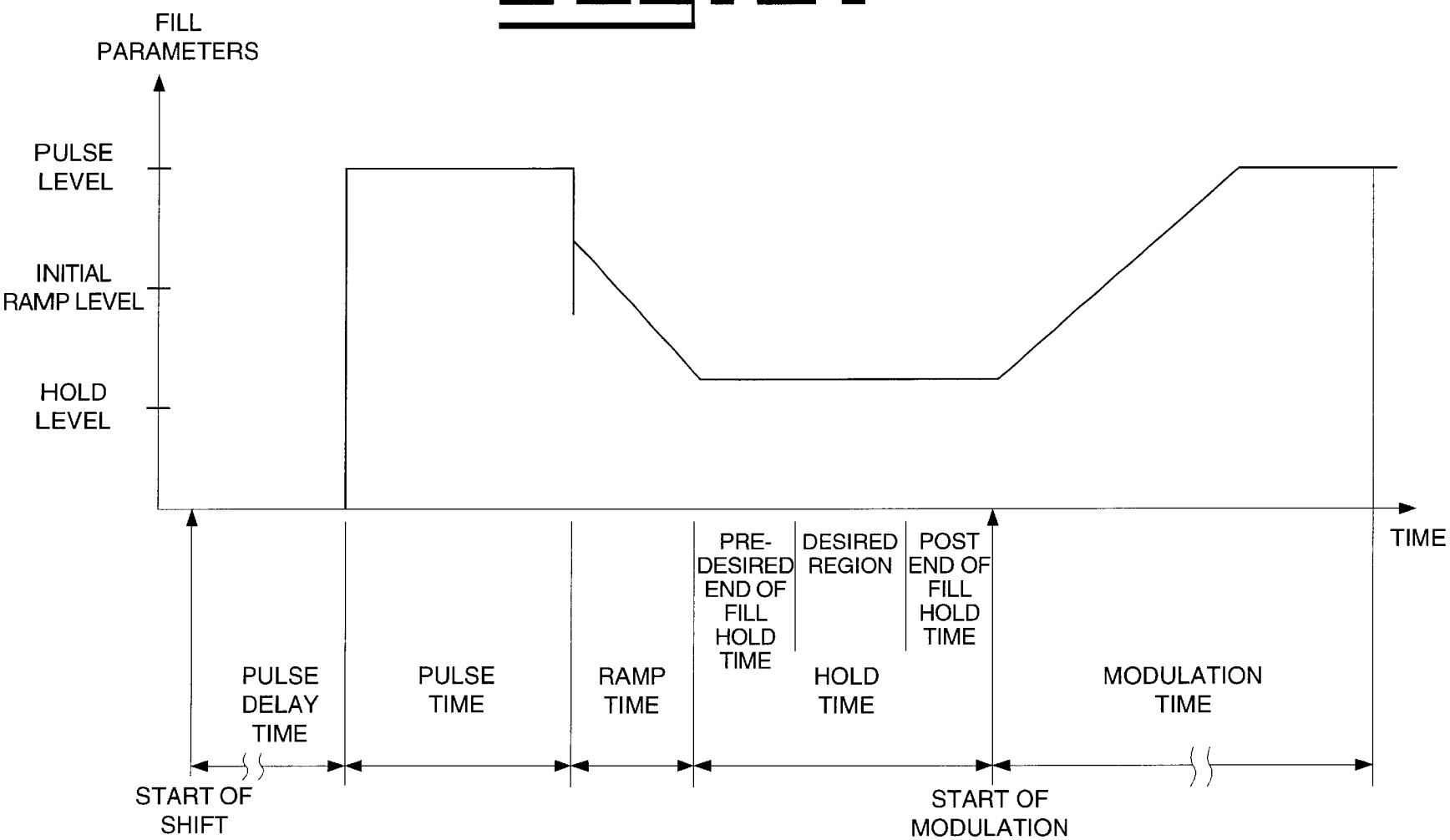
FIG. 5 is a timing chart illustrating the current level during the pulse time, ramp time, hold time, modulation time, and end-of-fill point in correlation with a desired end-of-fill region.

The dynamic adjustment of the timing of the end-of-fill point will now be discussed. FIG. 5 illustrates one embodiment of the clutch command pulses delivered to the solenoid control valve 83 by the electronic control module 40. As illustrated, the parameters of the clutch fill commands include a current level, or value, and a time duration. In addition, the duration over which a clutch 83 is filled may be characterized as including a pulse delay time, pulse time, fill ramp time, hold time, and modulation ramp time. Each time duration may be associated with a clutch fill command, e.g., a hold command or a fill ramp command. In the preferred embodiment, as stated above, the end-of-fill point occurs during the hold time enabling a smooth transition into the modulation time period, illustrated in 3. The smooth transition will prevent the torque spike that causes jerk and creates discomfort to the operator as well as decreasing the life expectancy of the drivetrain components.

In one embodiment, the hold time may be further characterized as a pre-desired end-of-fill hold time, desired end-of-fill region, and post-desired-end-of-fill hold time, as illustrated in FIG. 5. The end-of-fill point may be adjusted, by controlling the amount and rate the fluid fills the clutch 83, which may be controlled by the level and duration of the clutch commands. Therefore, for example, if the end-of-fill point occurs late, or after the desired end-of-fill region, the solenoid control valve can be commanded in a manner enabling fluid to fill the clutch 83 sooner thereby controlling the end-of-fill point to occur sooner.

In the preferred embodiment, the end-of-fill point is compared with the desired end-of-fill region. In one embodiment, the end-of-fill point may be determined to have occurred before, during, or after the desired end-of-fill region. In the preferred embodiment, the end-of fill point may be determined to have occurred in the fill ramp time, pre-desired-end-of-fill hold time, desired end-of-fill region, post-end-of-fill hold time, and modulation ramp region, as illustrated in FIG. 5.

Once the comparison is made between the end-of-fill point and the desired end-of-fill region, a determination is made regarding whether one or more of the clutch command parameters need adjusting to enable the end-of-fill point to occur within the desired end-of-fill region. The appropriate parameters are then adjusted if need be.

In the preferred embodiment, no adjustments are made to the clutch fill command parameters if the end-of-fill point falls within the desired end-of-fill region. In addition, no adjustments are made if the end-of-fill point occurs outside the five command pulse regions (fill ramp region through modulation ramp region). If the end-of-fill point occurs outside these regions then the assumption is that the measured end-of-fill point was not valid. In addition, no adjustment is made if the end-of-fill point occurs on the opposite side of the desired end-of-fill region from a filtered end-of-fill point. The filtered end-of-fill point may be the averaged value of prior end-of-fill points, e.g., the last five end-of-fill points. In an alternative embodiment, the filtered end-of-fill point may be the last valid end-of-fill point measured.

In the preferred embodiment, if an adjustment is necessary, e.g., the end-of-fill point occurred outside the desired region, the current level of the clutch fill command is adjusted. However, the current level and, or the time duration of the clutch fill command may be adjusted.

Figure 6:
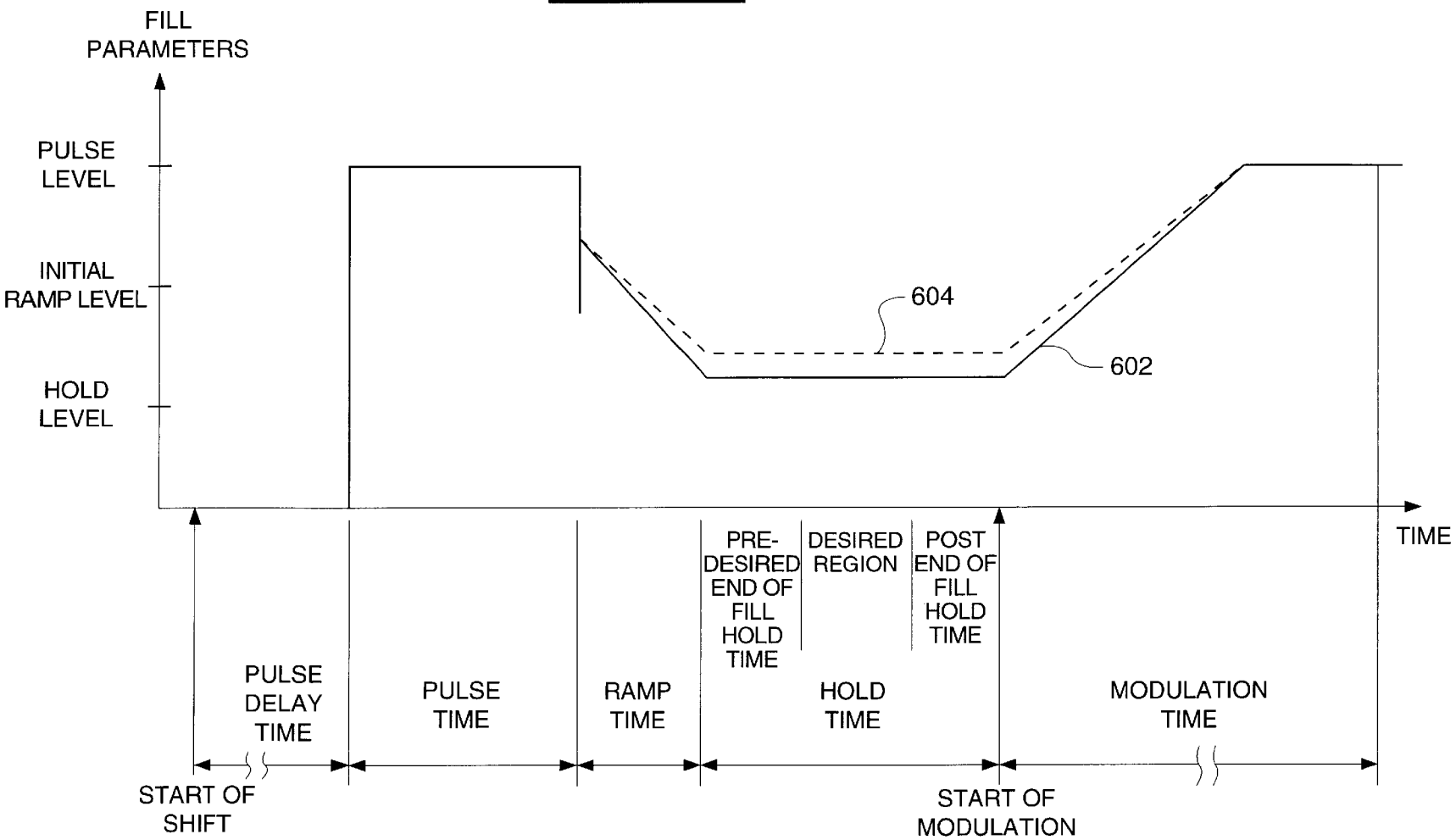
FIG. 6 illustrates one example of a modified command pulse sequence.
Figure 7:
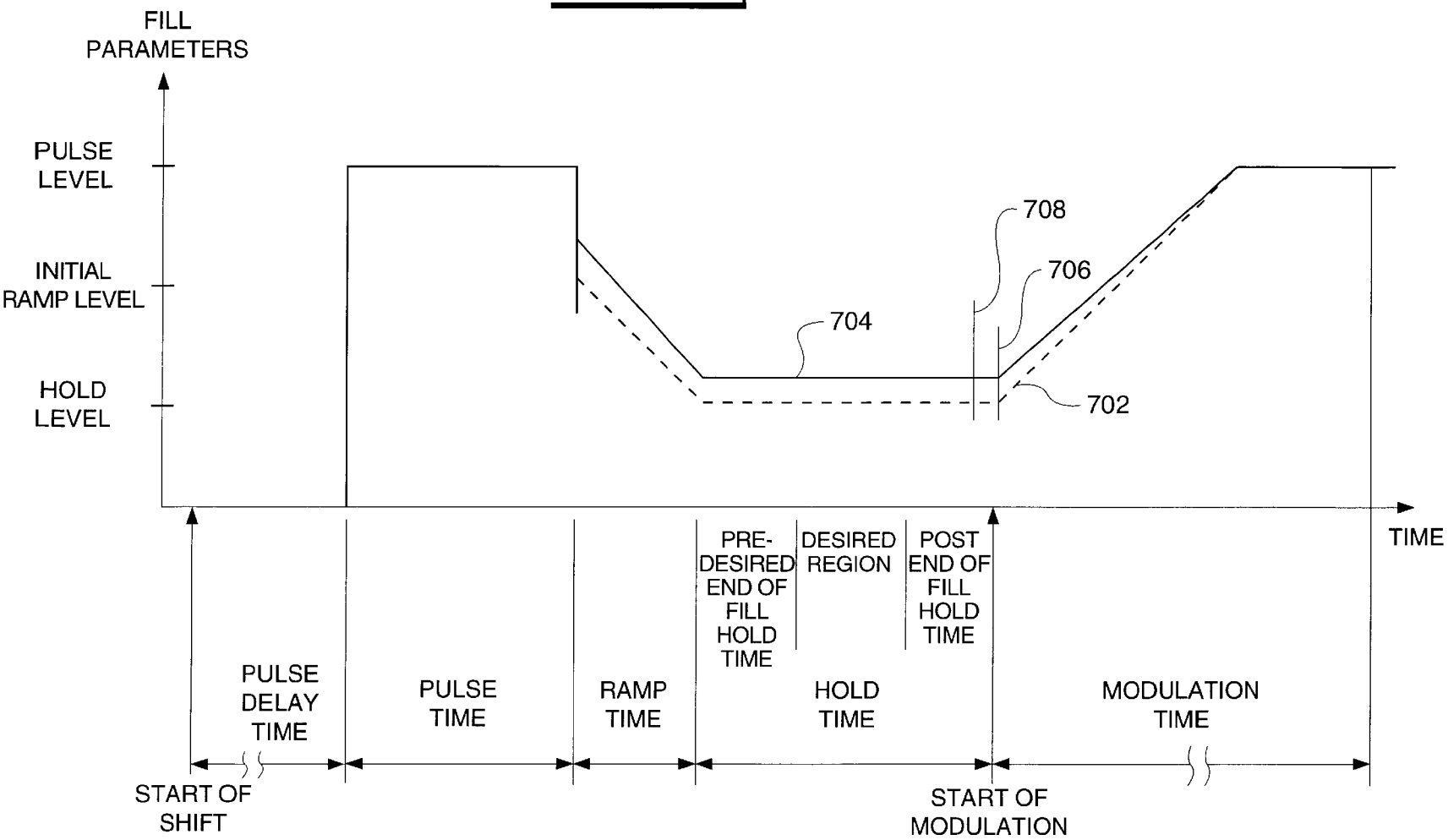
FIG. 7 illustrates a second example of a modified command pulse sequence.

If the end-of-fill point occurs late, i.e., after the desired region, then the clutch command parameters associated with the fill ramp time, hold time, or both may be increased. In one embodiment, if the end-of-fill point occurs in the post-desired-end-of-fill hold time, and the filtered end-of-fill point is in either the desired region or the post-desired-end-of-fill hold time, then the hold level, i.e., value of the current applied to the solenoid control valve during the hold time may be increased. FIG. 6 illustrates one example of a prior and subsequent command sequence 602 604 respectively. If the end-of-fill point occurs in the modulation ramp time, and the filtered end-of-fill point occurs in either the post desired-end-of-fill hold time or the modulation ramp time, then both the hold level, and fill ramp level may be increased. FIG. 7 illustrates one example of a prior and subsequent command sequence 702 704 respectively.

The decision to modify the hold level, fill ramp level, or both is implementation dependent. In addition, at what point the fill ramp level is modified in addition to the hold level, if they are both modified, is also implementation dependent. FIG. 6 and FIG. 7 illustrate one embodiment of the adjustments that may be made in response to the end-of-fill point occurring after the desired end-of-fill region. In addition, FIG. 6 and FIG. 7 illustrated using the break between the post-desired-end-of-fill region and the modulation time 706, to determine whether to adjust the hold level, fill ramp level, or both. A more aggressive approach to adjusting the location of the end-of-fill point may involve modifying the fill ramp level, along with the hold level, if the end-of-fill point occurs during the post-desired-end-of-fill region and time line 708.

In the preferred embodiment, the initial values of the fill ramp level and hold level are relatively low. The fill ramp and hold levels are then adjusted according to the occurrence of the end-of-fill point relative to the desired region. The hold level may be adjusted primarily to fine tune the timing of the end-of-fill point, and the fill ramp level may be adjusted primarily to account for the end-of-fill point occurring in the extreme regions, such as the fill or modulation ramp time.

If the end-of-fill point occurs early, i.e., before the desired region, then either the fill ramp level, hold level, or both may be decreased. In one embodiment, if the end-of-fill point occurs in the pre desired end-of-fill time and the filtered end-of-fill point occurred within either the desired region, or pre desired end-of-fill time, then the hold level may be decreased. If the end-of-fill point occurs in the fill ramp time, and the filtered end-of-fill occurs in the fill ramp time or the pre desired end-of-fill time, then both the hold level, and the first ramp level may be decreased.

In one embodiment, once the appropriate clutch command parameter is identified for adjusting, the amount of adjustment is determined. Predetermined adjustment values may be used. For example, a lookup table may be used that includes the fill ramp level adjustment value, hold level adjustment value, and the fill ramp and hold levels: upper limit, lower limit, and initial values. Therefore, each time an adjustment to the hold level is needed, the hold level may be adjusted by the predetermined hold level adjustment value, and then compared to an upper and lower limit to determine if the value has exceeded the limits. If the value has exceeded the limits, then the hold level is set to the limit. If the hold level exceeds the upper or lower limit, then, in one embodiment, the ramp level may be adjusted also to account for the hold level limit being reached.

In an alternative embodiment, the adjustment to the hold or fill ramp level may be dynamically determined based on how far outside the desired region the end-of-fill point occurred. Again, for small errors where the end-of-fill point occurred within the hold time, but outside the desired region, the hold level alone may be modified by a dynamically determined value. In addition, if the end-of-fill time occurred in either the fill or modulation ramp regions, then both the hold and fill ramp level may be dynamically modified to account for the error.

Figure 8:
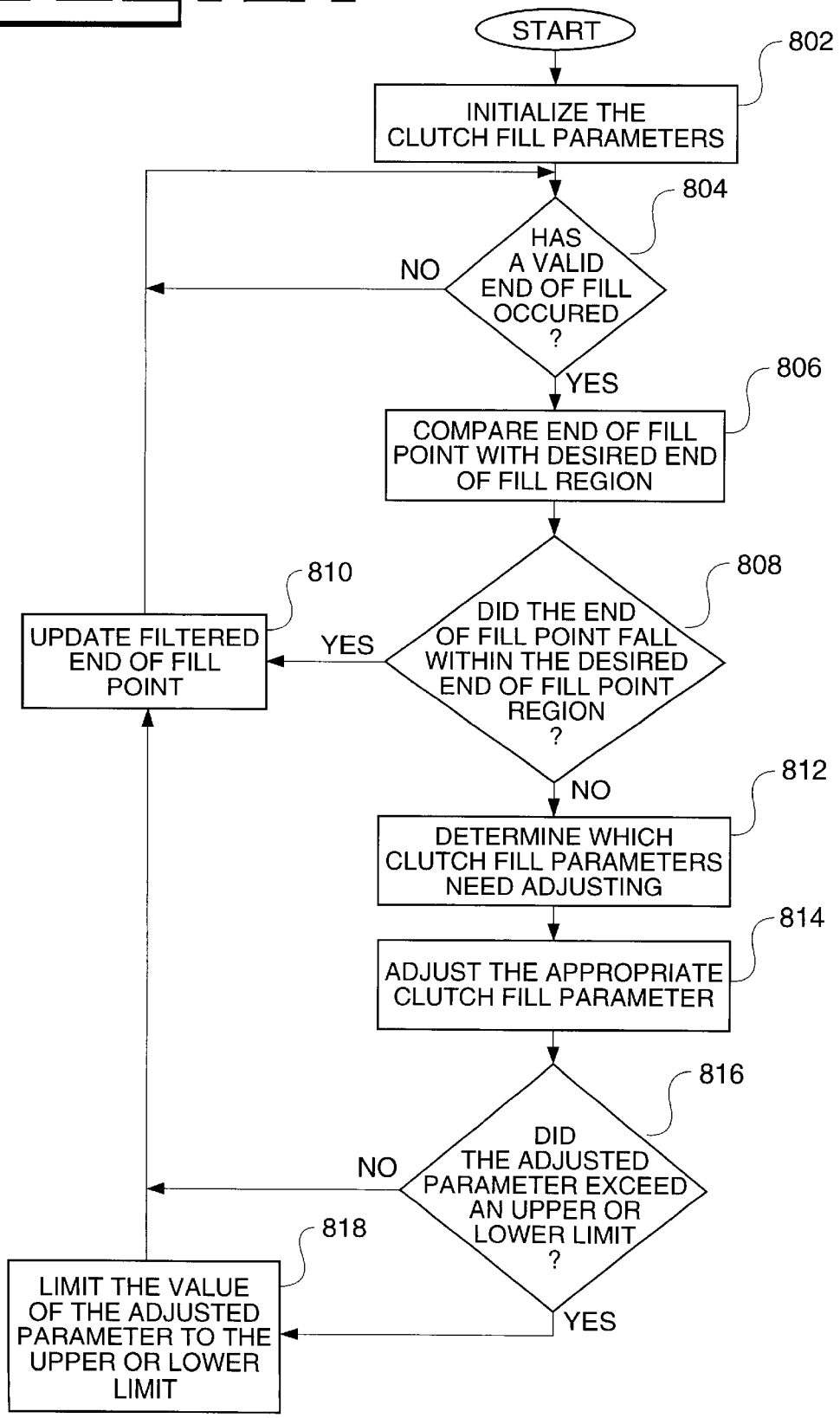
FIG. 8 is a flow chart illustrating software for controlling the timing of the filling of the clutch.

One embodiment of a method for controlling the end-of-fill point will now be discussed with reference to FIG. 8, which depicts a flowchart representative of the computer program instructions executed by the electronic control module 40, shown in FIG. 1. As shown in FIG. 8, the program first initializes the fill ramp, hold, and modulation ramp levels <802>. The levels may be contained within a lookup table and accessed during start up to initialize the levels. The program then determines whether a valid end-of-fill point has been detected <804>. If the present end-of-fill point occurs outside of the region defined by the fill ramp time through the modulation ramp time, then the end-of-fill point is determined to be invalid. In addition, if the end-of-fill point occurred on the opposite side of the desired end-of-fill region, then the point is determined to be invalid. If the point is determined to be invalid, then the method loops back to the beginning to wait for the next end-of-fill point.

In a third control block <806> the end-of-fill point is compared to a desired end-of-fill region. If the end-of-fill point falls within the desired end-of-fill region, then no adjustment is needed to the clutch command parameters. The program then updates the filtered end-of-fill point based on the present end-of-fill point <808>. Control then returns to the second control block <802> to determine if the next end-of-fill point is valid.

If the end-of-fill point falls outside the desired end-of-fill region, then a determination is made as to which clutch command parameters need adjusting <812>. For example, as described above, if the end-of-fill point falls within the modulation ramp time, then the fill ramp level and the hold level may be increased for the next command sequence. The appropriate clutch fill parameter(s) may be adjusted by either accessing a table of predetermined adjustment values, or by dynamically determining the adjustment value based on the occurrence of the end-of-fill point relative to the desired end-of-fill region <814>.

Once the adjustment to the appropriate clutch fill parameter(s) is made, the adjusted value is checked to determine if it has exceeded an upper or lower limit <816>. Again, the upper and lower level limits may be predetermined and stored in a table, or dynamically determined. If a limit has been exceeded then the level is set to the limit. In one embodiment, if the level has exceeded the limit, then the level may be set to the limit, and the other level may be adjusted to compensate for the overrun. For example, if the end-of-fill point occurs in the second ramp time, then the fill ramp level and hold level may be modified to adjust the end-of-fill point. If the fill ramp level, after modification, exceeds the upper limit, then the fill ramp level will be limited to the upper limit, and the hold level may be increased an additional amount to compensate for not modifying the fill ramp level as much as desired.

Once the appropriate parameter(s) are adjusted, the end-of-fill point is used to update the filtered end-of-fill point <810>, and control returns to control block <802>.

Industrial Applicability

The present invention discloses a system and a method for controlling the timing of the filling of a fluid actuate. The system includes, a fluid actuated clutch 83, an electronic controller adapted to detect an end-of-fill point for the fluid actuated clutch 83, compare the end-of-fill point with a desired end-of-fill point and adjust at least one of a plurality of clutch fill parameters in response to the comparison in order to control the timing of the filling of the clutch 83, and a control valve that is activated by the electronic controller.

The present invention is advantageously applicable in controlling the shifting of a clutch 83 utilized in conjunction with a torque converter, typically, but not limited to, construction machines such as motor graders, off-highway trucks, wheel loaders, bulldozers, and the like. The following description is only for the purposes of illustration and is not intended to limit the present invention as such. It will be recognizable, by those skilled in the art, that the present invention is suitable for a plurality of other applications.

In one embodiment, the end-of-fill point may be detected by detecting a marked decrease in the instantaneous value of the clutch slip as the end-of-fill point or end-of-fill time. This determination occurs when the instantaneous clutch slip is less than an reference value of the clutch slip. In one embodiment the reference clutch slip value is the average of a predetermined number of loops or cycles of clutch slip that is divided by a predetermined factor. In an alternative embodiment, the reference clutch slip value is the output of a low pass digital filter software algorithm, divided by a predetermined factor. The fill time is defined as the time required to fill an on-coming clutch cavity with fluid. During this fill period, the clutch piston will stroke and the clutch plates touch-up. However, until the clutch plates are initially compressed, the clutch 83 cannot transmit any torque. Therefore, the end-of-fill time is important in order to ascertain when this critical moment is reached. The present invention can eliminate both early engagement and late engagement by adjusting the appropriate clutch command fill parameters in response to an early or late end-of-fill point. Early or late engagement can result in a torque spike that is transmitted through the drivetrain 10 of the machine and creates a "jerk". The elimination of jerk will make the operator more comfortable and increase the life expectancy of the associated components located within the drivetrain of the machine. Elimination of late engagement pressure will prevent even greater amounts of jerk than early engagement.

In view of the foregoing, it is readily apparent that the subject end-of-fill detection method, and dynamic adjustment of the end-of-fill point, provides a determination of end-of-fill in a very simple and effective manner that results in a high quality engagement of a fluid actuated clutch.

Other aspects, objects and advantages of the present invention can be obtained from a study of the drawings, the disclosure and the appended claims.

What is claimed is:

1. A system for controlling the timing of the filling of a fluid actuated clutch comprising:

a fluid actuated clutch;

an electronic controller adapted to detect an end-of-fill point for said fluid actuated clutch, compare said end-of-fill point with a desired end-of-fill point and dynamically adjust at least one of a plurality of clutch fill parameters in response to said comparison in order to control the timing of the filling of the clutch; and a control valve that is activated by said electronic controller and said control valve is operatively connected to said fluid actuated clutch.

2. A system, as set forth in claim 1, further comprising:

an input mechanism that generates a signal, including a value for an input speed of said fluid actuated clutch and a value of output speed for said fluid actuated clutch; and wherein said controller is further adapted to detect an instantaneous clutch slip, which is a difference between said input speed of said fluid actuated clutch and said output speed of said fluid actuated clutch and detect when said instantaneous clutch slip is less than a dynamically determined reference clutch slip value, where this condition represents said end-of-fill point for said fluid actuated clutch.

3. A system, as set forth in claim 2, wherein said electronic controller is further adapted to responsively compare said end-of-fill point with a desired end-of-fill region, and adjust said at least one of a plurality of clutch fill parameters in response to said end-of-fill point being outside said desired end-of-fill region, said parameters including a fill ramp command and a hold command, said fill ramp and hold commands having a current level and a time duration.

4. The system of claim 3, wherein said electronic controller is further adapted to determine which of said plurality of clutch fill parameters to adjust in response to said comparison.

5. The system of claim 4, wherein said electronic controller selects a predetermined adjustment value for said parameter and responsively adjust said parameter.

6. The system of claim 4, wherein said electronic controller is adapted to dynamically determine an adjustment value for said parameter.

7. The system, as set forth in claim 1, wherein said controller is further adapted to compare said end-of-fill point with a previous end-of-fill point and adjust said at least one of a plurality of clutch fill parameters in response to said end-of-fill point being outside said desired end-of-fill region, and said end-of-fill point being within a predetermined threshold of said previous end-of-fill point.

8. The system, as set forth in claim 7, wherein said previous end-of-fill point is a filtered end-of-fill point.

9. The system, as set forth in claim 8, wherein said controller is adapted to adjust said hold command when said end-of-fill point occurs later than said desired end-of-fill region, and adjust said ramp command and said hold command when said end-of-fill point occurs a threshold value later than said desired end-of-fill region.

10. The system, as set forth in claim 9, wherein said controller is adapted to adjust said hold command when said end-of-fill point occurred earlier than said desired end-of-fill region, and adjust said hold command and said ramp command when said end-of-fill point occurred a threshold value earlier than said desired end-of-fill region.

11. A method for controlling the timing of the filling of a fluid actuated clutch, which is operatively connected to a control valve that is activated by an electronic controller the method comprising the steps of:

determining an end-of-fill point;

comparing said end-of-fill point with a desired end-of-fill point; and dynamically adjusting at least one of a plurality of clutch fill parameters in response to said comparison in order to control the timing of the filling of said fluid actuated clutch.

12. A method, as set forth in claim 11, wherein the step of determining an end-of-fill point further comprises the steps of:

receiving a signal from an input mechanism, including a value for an input speed of said fluid actuated clutch and a value of output speed for said fluid actuated clutch;

detecting an instantaneous clutch slip, which is a difference between said input speed of said fluid actuated clutch and said output speed of said fluid actuated clutch; and detecting when said instantaneous clutch slip is less than a dynamically determined reference clutch slip value, where this condition represents the end-of-fill point for said fluid actuated clutch.

13. A method, as set forth in claim 12, further comprising the steps of:

comparing the end-of-fill point with a desired end-of-fill region; and adjusting said at least one of a plurality of clutch fill parameters in response to said comparison, said parameters including a fill ramp command and a hold command, said fill ramp and hold commands having a current level and a time duration.

14. The method of claim 13, wherein the step of adjusting said at least one parameter further comprises the step of said adjusting at least one parameter when said end-of-fill point occurs outside said desired end-of-fill region.

15. A method as set forth in claim 14, wherein the step of adjusting said clutch parameters includes the step of adjusting said parameters by a predetermined amount.

16. A method, as set forth in claim 14, wherein the step of adjusting said clutch parameters includes the step of adjusting said parameters by a dynamically determined amount.

17. A method, as set forth in claim 16, further comprising the steps of:

comparing said end-of-fill point with a previous end-of-fill point and adjusting said at least one of a plurality of clutch fill parameters in response to said end-of-fill point being outside said desired end-of-fill region and said end-of-fill point being within a predetermined threshold of said previous end-of-fill point.

18. The system, as set forth in claim 17, wherein said previous end-of-fill point is a filtered end-of-fill point.

19. The system, as set forth in claim 18, wherein the step of adjusting said at least one of said parameters further comprises the steps of:

adjusting said hold command when said end-of-fill point is occurs later than said desired end-of-fill region; and adjusting said ramp command and said hold command when said end-of-fill point occurs a threshold value later than said desired end-of-fill region.

20. The system, as set forth in claim 19, wherein the step of adjusting at least one of said parameters further comprises the steps of:

adjusting said hold command when said end-of-fill point occurs earlier than said desired end-of-fill region; and adjusting said hold command and said ramp command when said end-of-fill point occurs a threshold value earlier than said desired end-of-fill region.

* * * * *